M. L. TALBERT.
HEATING STOVE.
APPLICATION FILED FEB. 7, 1921.

1,413,141.

Patented Apr. 18, 1922.

Inventor
MARK L. TALBERT

By
C. L. Parker Attorney

UNITED STATES PATENT OFFICE.

MARK L. TALBERT, OF SPENCER, NORTH CAROLINA.

HEATING STOVE.

1,413,141.  Specification of Letters Patent. Patented Apr. 18, 1922.

Application filed February 7, 1921. Serial No. 443,096.

*To all whom it may concern:*

Be it known that I, MARK L. TALBERT, a citizen of the United States, residing at Spencer, in the county of Rowan and State of North Carolina, have invented certain new and useful Improvements in Heating Stoves, of which the following is a specification.

This invention relates to heating stoves, and it comprises a casing having an open front, a burner arranged in said casing near the bottom, a fire back arranged above said burner, said fire back comprising an outer covering of metal and a filling of asbestos or the like, openings arranged at the bottom and back of the casing, and a space extending in the rear of said fire back and adapted to receive the products of combustion from the burner.

In the present invention, I have provided a heater of the open fire place type, where liquid fuel may be employed. The front of the heater is open and the burner is arranged near the bottom. Air to support combustion enters the front of the casing and passes to the burner. Above the burner, there is provided a fire back, comprising an outer coating of metal and a filling of asbestos or similar material. The products of combustion from the burner strike the front of the fire back, and then pass upwardly to the space between the fire back and the casing and pass around the fire back to the openings in the back of the casing. The construction provides a very efficient type of heater.

If desired, a water receptacle may be arranged on the top of the casing and the products of combustion before passing from the heater come in contact with the bottom of the water receptacle whereby sufficient water is vaporized to maintain the proper degree of moisture in the room.

In the accompanying drawing, I have shown one embodiment of the invention. In this showing:

Figure 1:
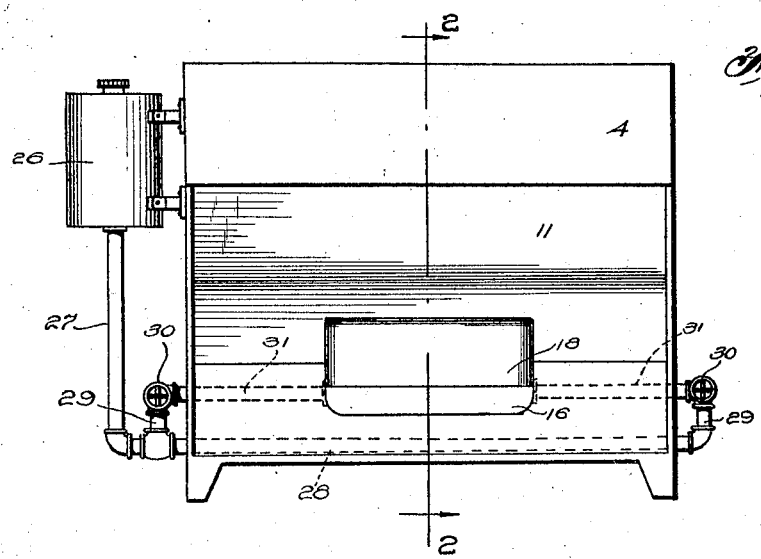
Figure 1 is a front elevation of the heater.
Figure 3:
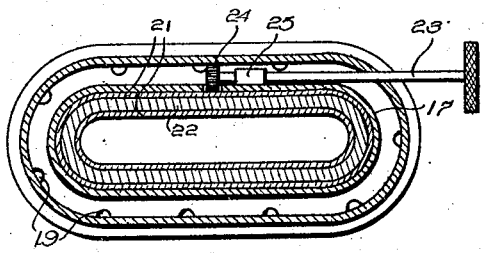
Figure 3 is a horizontal sectional view on line 3—3 of Figure 2.
Figure 2:
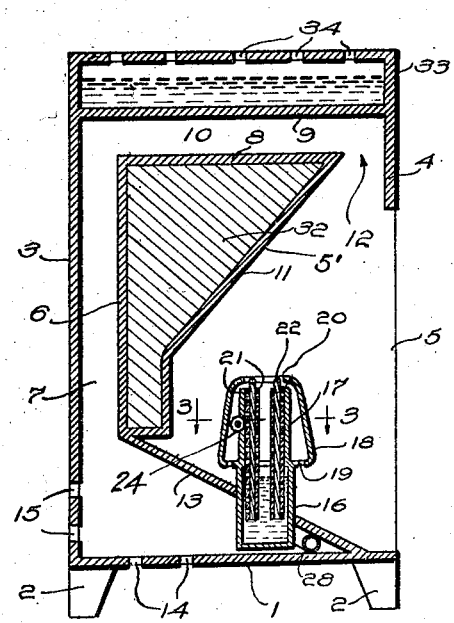
Figure 2 is a vertical sectional view on line 2—2 of Figure 1.
Figure 4:
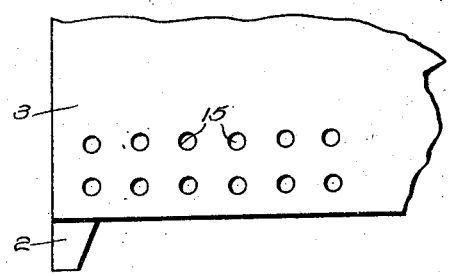
Figure 4 is a detail view showing the outlet openings.

Referring to the drawing, the reference numeral 1 designates the base of the burner casing which, as shown, is supported on legs 2 to space the casing from the floor. The casing is provided with a back 3 and a front 4 which is provided with an opening 5. The stove is provided with a fire back 5' arranged within the casing. The back wall 6 of the fire back is slightly spaced from the rear wall 3 of the casing to provide a space 7. The top 8 of the fire back is also spaced from the top 9 of the casing to provide a space 10. The front 11 of the fire back is inclined, as shown, providing a relatively restricted outlet 12 for the products of combustion. A plate 13 extends from the bottom of the fire back to the base of the casing separating the space 7 from the front of the stove. Suitable air inlet openings 14 may be provided for the introduction of air. Outlet openings 15 are provided in the rear wall of the casing adjacent the bottom. The fire back may be formed of metal or other suitable material and is provided with a filling 32 of asbestos or other heat insulating material.

A suitable burner is arranged near the bottom of the casing, extending through the plate 13. As shown, the burner comprises a lower compartment or section 16, and an upper section 17 surrounded by an air chamber 18. The air chamber 18 is provided with inlet openings 19 for the introduction of cold air, and opening 20 arranged at the top of the burner. Within the burner casing, there is provided a pair of perforated members 21 slightly spaced from each other for the reception of a wick 22. The flame may be regulated in any suitable manner, as by an operating member 23, carrying a pinion 24, the teeth of which extend through the perforations in the outer perforated member 21 and engage the wick. As shown, the operating member is supported in a sleeve 25, carried by the burner section 17.

Fuel may be supplied from a fuel tank 26, mounted at any suitable point and having a delivery pipe 27. This pipe communicates with a pipe 28, extending across the heater and communicating with vertical pipes 29. Valves 30 may be arranged in these vertical pipes, whereby delivery of oil to horizontal pipes 31 may be controlled. The horizontal pipes 31 communicate with and deliver oil to the lower section 16 of the burner casing.

In operation, fuel is delivered from the tank 26 to the burner through the pipes 27, 28, 29 and 31. By a proper regulation of the valves 30, the supply of fuel may be controlled, and when a very low fire is being burned, one of the valves 30 may be entirely closed. The flame is regulated by the operating member 23, which raises and lowers the wick 22, and the fuel drawn up by the wick is burned with the air passing through the air chamber 18, the air being heated while passing through said chamber. The products of combustion pass upwardly from the burner and strike the inclined front 11 of the fire back. As the exterior of the fire back is formed of metal and a good conductor of heat, the front 11 absorbs the heat from the products of combustion which then pass upwardly through the restricted opening 12 and are prevented from passing into the room by the overhanging portion of the front wall 4. The products of combustion pass through the spaces 10 and 7 and through the outlet openings 15. The asbestos filling takes up the heat absorbed by the fire back and the heat is radiated from the front 11 into the room. The front of the fire back may be formed of copper or other bright metal, whereby the light from the burner will also be reflected into the room. The plate 13 divides the rear of the fire back through which the products of combustion pass from the space in front of the fire back in which the burner is positioned, whereby air is delivered to the burner and the products of combustion carried off through the spaces 7 and 10.

Water may be placed in a receptacle 33 arranged on the top of the stove and provided with openings 34. The vaporization of the water supplies sufficient moisture to the air to maintain the air in proper condition.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A heater comprising a casing, a front plate extending downwardly a slight distance from the top of the casing, the remainder of the front of the casing being open, a burner arranged near the bottom of the casing, a fire back arranged above said burner and spaced from the back and top of the casing to provide a space between the fire back and the back and top of the casing, the top of the fire back being arranged above the bottom of the front plate, said fire back being provided with a filling of heat insulating material, and a plate extending from the bottom of the fire back to the bottom of the casing to separate the space behind the fire back from the front of the casing, the rear wall of the casing being provided with outlet openings adjacent the bottom thereof for the escape of the products of combustion.

In testimony whereof I affix my signature in presence of two witnesses.

MARK L. TALBERT.

Witnesses:
  W. D. CORNELISON,
  B. H. CORNELISON.